April 29, 1952  A. L. DIXON ET AL  2,595,060
PRESSURE-SENSITIVE TAPE DISPENSING MACHINE
Filed Oct. 17, 1947  2 SHEETS—SHEET 1
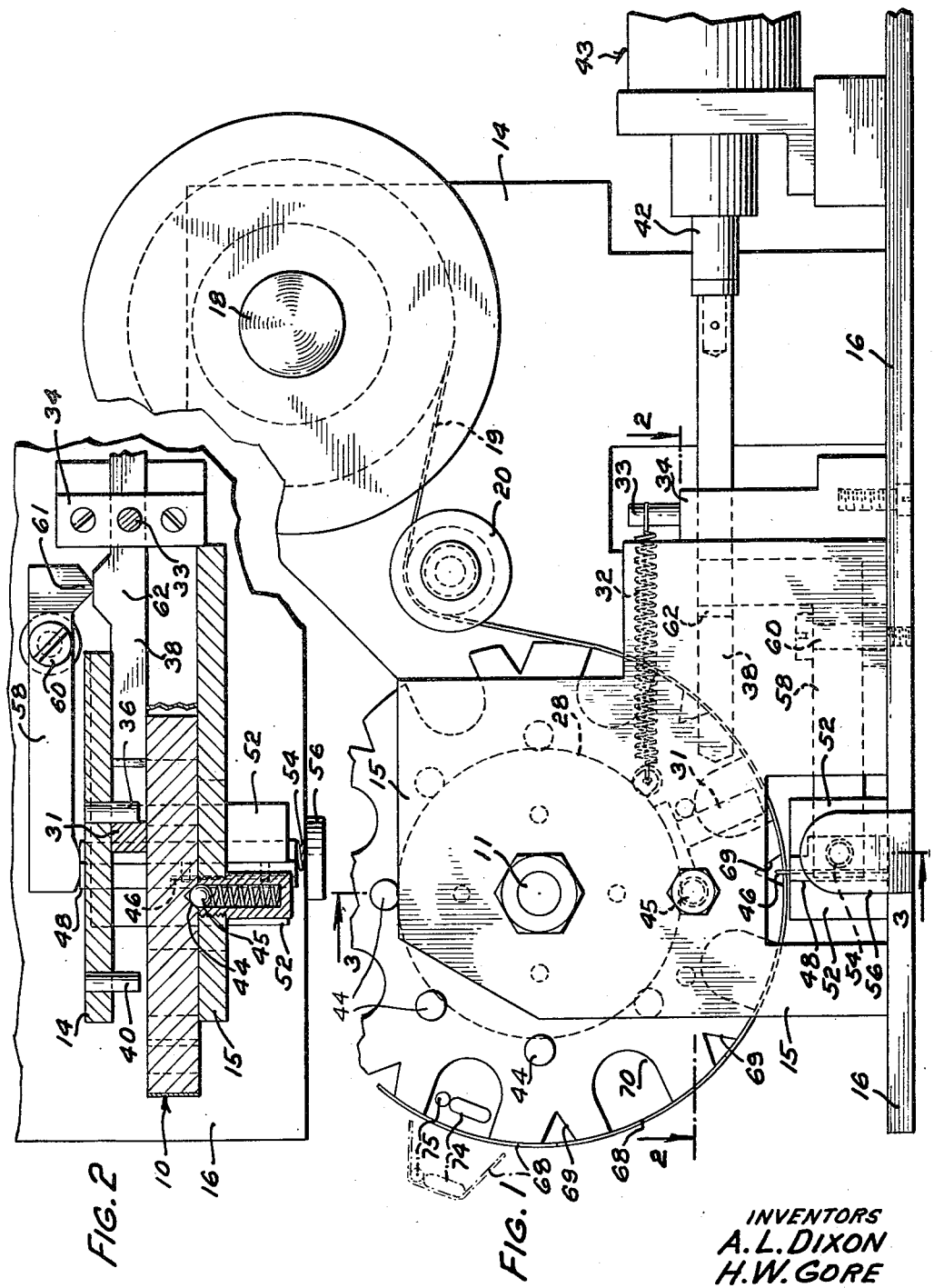
INVENTORS
A. L. DIXON
H. W. GORE
J. W. RICE
BY
ATTORNEY

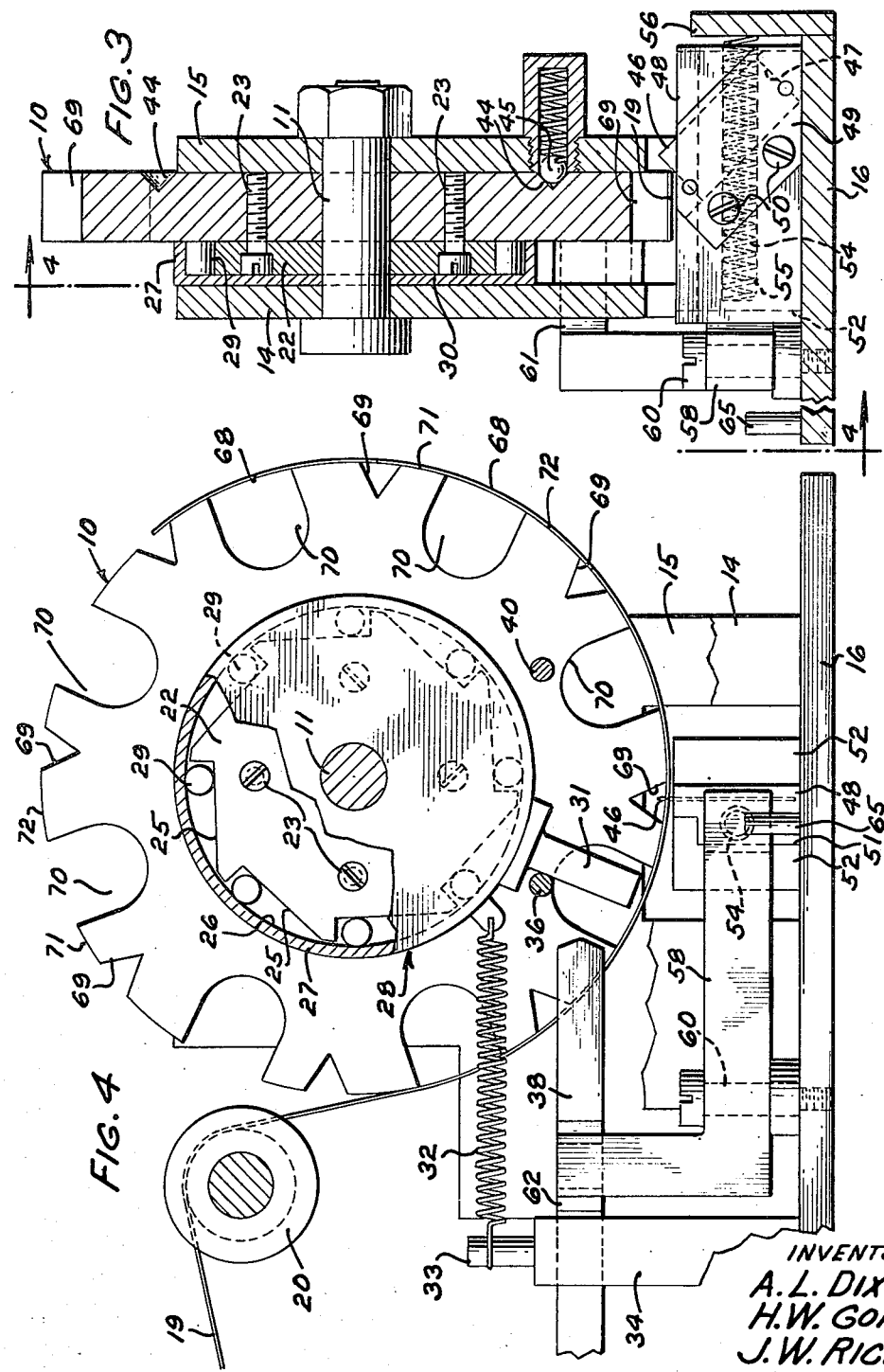

UNITED STATES PATENT OFFICE 2,595,060

PRESSURE-SENSITIVE TAPE DISPENSING MACHINE

Alfred L. Dixon and Howard W. Gore, Western Springs, and James W. Rice, Hinsdale, Ill., assignors to Western Electric Company, Incorporated, New York, N. Y., a corporation of New York Application October 17, 1947, Serial No. 780,386

2 Claims. (Cl. 164—73)

This invention relates to a dispensing machine for tacky or pressure-sensitive tape and more particularly to a tape dispensing machine having a peripherally recessed dispensing wheel for supporting cut lengths of tape which may be removed by engagement therewith of the articles to which the lengths of tape are to be applied.

It is an object of the present invention to provide a tacky tape dispensing machine of simple construction through the utilization of which one may readily attach severed lengths of tape to articles.

In accordance with one embodiment of the invention, a tape dispensing wheel is provided to receive on its periphery the adhesive or pressure-sensitive side of a tacky tape. This dispensing wheel, which has a plurality of article-receiving peripheral recesses, is mounted for intermittent rotary movement and is adapted to be actuated by a one-way type of drive mechanism and for each intermittent movement of the wheel a new length of tape will be severed by a cutter from the supply thereof and will be presented in position spanning a recess in the periphery of the wheel, whereby articles which are to be bound together by the adhesive tape may be inserted in the recess and the tape simultaneously attached to the parts and removed from the wheel by movement of the parts radially outwardly with respect to the wheel.

Other objects and advantages of the invention will be more fully understood by reference to the following detailed description thereof and the accompanying drawings illustrating a preferred embodiment of the invention in which Fig. 1 is a front elevational view of the tape dispensing machine with portions thereof broken away;

Fig. 2 is a fragmentary horizontal sectional view of the machine taken on the line 2—2 of Fig. 1;

Fig. 3 is an enlarged vertical sectional view taken on the line 3—3 of Fig. 1; and Fig. 4 is a fragmentary vertical rear elevational and sectional view taken on the line 4—4 of Fig. 3.

Referring to the drawings, the dispensing machine comprises a dispensing wheel 10 axially apertured to receive a shaft or pin 11 on which it is rotatably mounted. The shaft 11 is mounted in apertures in a pair of plates 14 and 15 spaced from each other and extending upwardly from and rigidly secured to a base plate 16. The plate 14 extends to the right of the wheel 10, as viewed in Fig. 1, and has secured thereto a post 18, on which may be supported a supply roll of adhesive tape 19. The adhesive tape is adapted to be fed from the supply roll over an idler roll 20 and onto the cylindrical periphery of the dispensing wheel 10, with the adhesive side of the tape directed inwardly in engagement with the cylindrical surface of the wheel, thus causing the tape to adhere to the wheel.

The wheel 10 is adapted to be rotated in a step by step motion and is provided with a clutch element 22 secured to the wheel by screws 23 and apertured to receive the shaft 11. The clutch element 22, in the form of a disc, is provided with a plurality of peripheral rectangular notches having surfaces 25 (Fig. 4) which cooperate with the inner surface 26 of a cylindrical flange 27 of a cooperating clutch member 28 to form wedge-shaped recesses, in each of which is mounted a roller 29. The cylindrical portion 27 (Fig. 3) is formed as a flange on an aperture disc portion 30 of the clutch member 28, which is mounted between the wheel 10 and the frame plate 14 for rotation about the axis of the shaft 11 and has an arm 31 radially extending therefrom. The clutch element 22 and the clutch member 28, in cooperation with the plurality of rollers 29, form a roller-type one way clutch adapted to be oscillated to drive the wheel 10 step by step in one direction.

The clutch member 28 is oscillatable about the axis of the shaft 11 and is moved in one direction by a contractile spring 32 having one end thereof connected to the member 28 and the other end secured to a pin 33 mounted on a guide block 34, which is fixed to the base 16. The extent of rotation in this direction is limited by a pin 36 extending from the wall 14 into the path of the arm 31 on the clutch member 28. The member 28 is rotated in the opposite direction by a reciprocable actuating rod 38, which, on its forward movement, engages the arm 31 of the clutch member 28 and imparts a predetermined rotary movement thereto which is limited by the engagement of the arm 31 with a stop pin 40 mounted on the frame plate 14. The rod 38 is supported in a recess in the guide block 34 and is mounted on the forward end of a piston rod 42 of a fluid actuator 43, which is partially illustrated in Fig. 1. The actuator 43 serves to reciprocate the piston 42 and the actuating rod 38 by fluid pressure admitted to the actuator under control of valves, not shown, actuated by the operator.

On one face thereof, the feed wheel 10 is provided with a plurality of conical recesses 44 arcuately spaced about the axis of the wheel corresponding to arcuate distances rotated during each increment of feeding movement thereof. The recesses 44 are adapted to receive a spring-pressed ball or detent 45 mounted in a predetermined position on the frame plate 15 for yieldably holding the feed wheel 10 stationary during the dwell interval between feeding movements.

It will be seen, from the description thus far, that under the control of the operator the piston 42 and the rod 38 may be reciprocated by the actuator 43 to oscillate the clutch member 28 and rotate the wheel 10 through a predetermined arc to feed a predetermined length of tape and that during the return movement of the rod 38, the spring 32 acts to return the clutch member 28 to its original starting position, shown in Fig. 4, and that during the return movement of the clutch member 28, the feed wheel 10 is held stationary by the detent 45.

After each increment of feeding movement of the feed wheel 10, the adhesive tape thereon is severed at a point in a predetermined angular relation to the axis of the wheel by a transverse movement of a knife actuated by mechanism in response to the return movement of the actuating rod 38. The knife in the embodiment illustrated herein comprises a razor blade 46 angularly disposed in a recess 47 in a slide member 48 and clamped in position therein by a removable clamping plate 49 and a pair of screws 50. The slide member 48 is slidable on a base plate 16 and is guided for rectilinear motion transversely of the tape in a guideway 51 formed in guide members 52—52 secured to the base plate 16. A compression spring 54, having one end engaging the end of a recess 55 formed in the slide member 48 and having its other end seated against a plate 56 fixed to the base 16 serves to move the slide member 48 to its rearward position or to the left, as viewed in Fig. 3.

The lefthand end of the slide member 48, as viewed in Fig. 3, is engaged by the curved end portion of a lever 58 pivotally mounted intermediate its ends on the base plate 16 for oscillating movement about a vertical pivot 60. The other end of the lever 58 extends upwardly (Fig. 4) and is provided with a pointed nose 61 (Fig. 2), which is engageable with a cam 62 extending laterally from the side of the actuating rod 38. Upon reciprocation of the actuating rod 38, the cam 62 will cause the lever 58 to oscillate about its pivot 60 and the oscillation of the lever 58, in cooperation with the compression spring 54, effects the reciprocation of the slide member 48 and the knife 46. A stop pin 65 on the base 16 may be provided to limit the rearward movement of the slide 48.

In its rearward position, the forward end of the actuating rod 38 is spaced from the arm 31 (Fig. 4) of the clutch member 28 and as the rod 38 is advanced, the nose 61 of the lever 58 will ride off the cam 62 on the rod 38 before the end of the rod 38 engages the arm 31, thus permitting the compression spring 58 to move the slide 48 to its rearward position and thus carry the knife 46 to the opposite side of the tape from the position illustrated in Fig. 3. As the rod 38 continues its advancing movement after engagement with the arm 31, it rotates the clutch member 28 through a predetermined arc, and the clutch member 28, through the rollers 29 and the clutch element 22, rotates the feed wheel 10 through the same predetermined arc. On the first portion of the return stroke of the rod 38, the spring 32 acts to rotate the clutch member 28 in a clockwise direction and return it to the position shown in Fig. 4, while the wheel 10 remains stationary. The compression spring 54 serves to hold the slide 48 and the blade 46 in a rearward position during the rotation of the feed wheel 10 and the oscillation of the clutch member 28. The actuating rod, as it continues its return movement, disengages itself from the arm 31 and the cam 65 on the rod 38 engaging the nose 62 of the lever 58 rocks the lever about the pivot 60 and causes the slide 48 and the knife 46 to be advanced to its forward position, shown in Fig. 3. The knife 46, in moving transversely across the face of the feed roll 10, cuts the tape 19 supported thereon into strips 68 of predetermined length. V-shaped grooves 69 in the periphery of the wheel 10 provide clearance for the passage of the blade 46.

A plurality of relatively large radially extending recesses 70 are provided in the periphery of the wheel 10, one between each pair of adjacent grooves 69. The grooves 69 and the recesses 70 form pairs of spaced surfaces 71—72 on the periphery of the wheel, each pair of which is adapted to support an individual strip 68 of tape. With this construction of dispensing wheel, the article or articles on which the tape is to be applied may be inserted in the recess 70 and moved radially outwardly, engaging the strip of tape 68 and stripping it from the surfaces 71 and 72 of the wheel. The embodiment of the invention illustrated is used in applying strips of tape to composite articles comprising condenser elements 74 and resistance elements 75, which are to be bound together by the tape. The elements 74 and 75 held in abutting relation to each other are inserted in a recess 70, as indicated in Fig. 1, and moved radially outwardly, first engaging the tape and then acting to strip the section of tape 68 from the wheel, as indicated in dotted lines in Fig. 1. The free ends of the strip 68 of tape may then be wrapped around the elements 74 and 75 to securely hold the parts together. The fluid actuator 43, under control of the operator, may then be operated to index the feed wheel one increment and thus cut another strip of tape from the supply and feed another strip of tape into a position where it may be removed from the wheel by the articles to which it is to be applied.

What is claimed is:

1. A dispenser for tacky tape comprising a base, a feed wheel rotatably mounted on said base and having a plurality of spaced apart tape-supporting surfaces for feeding tape adhered to said surfaces, clutch means operatively connected to said feed wheel in radially spaced relation to the tape-supporting surfaces and including an oscillatable member for rotating said feed wheel in one direction through a predetermined arc, a cutting member having a cutting edge for cutting said tape, a guideway on said base for guiding said cutting member for movement across the tape on said feed wheel in a direction parallel to the axis of said wheel to cut said tape into sections, a lever pivotally mounted on said base and operable to move the cutting member in one direction to cut said tape, spring means stressing said cutting member for movement in the opposite direction, an actuating member mounted on said base for reciprocable movement operable to actuate said oscillatable member to effect the rotation of said feed wheel, and a cam on said actuating member engageable with said lever and operable in response to reciprocation of said actuating member to rock said lever and cause the movement of said cutting member transversely across the tape in timed relation to the rotation of said feed wheel to cut said tape.

2. A dispenser for tacky tape comprising a base, a feed wheel rotatably mounted on said base for supporting and feeding tacky tape adhered to the periphery thereof, said feed wheel having a plurality of regularly spaced axially extending cutting grooves in the periphery thereof, a cutter comprising a blade, guide means on said base for guiding said cutter for movement across the tape on said feed wheel in a direction parallel to the axis of said feed wheel, a lever pivotally mounted on said base having one end engageable with said cutter and operable for moving said cutter in one direction from a retracted position on one side of said wheel to an advanced position on the other side of said wheel to cut the tape thereon, spring means stressing said cutter for movement in the opposite direction, one-way clutch means including a member oscillatable through a predetermined arc to rotate the feed wheel through said predetermined arc to feed said tape and to move successive ones of said cutting grooves into alignment with the path of movement of said cutter, an actuator rod mounted for reciprocation on said base and operable for actuating said oscillatable member through said predetermined arc, means mounted on said base for reciprocating said actuating rod, and a cam on said actuating rod engageable with said lever and operable for causing the oscillation of said lever in response to the reciprocation of said actuating rod, the parts being so arranged and operable that the actuator rod in response to forward movement thereof serves sequentially to cause the movement of the cutter to its retracted position and the rotation of said feed wheel through said predetermined arc to feed said tape, and in response to return movement thereof to cause the movement of said cutter to its advanced position to cut said tape.

ALFRED L. DIXON.
HOWARD W. GORE.
JAMES W. RICE.

REFERENCES CITED

The following references are of record in the file of this patent:

UNITED STATES PATENTS

| Number | Name | Date |
| --- | --- | --- |
| 1,543,183 | Mortimer | June 23, 1925 |
| 2,298,360 | Fitch | Oct. 13, 1942 |
| 2,384,575 | Stull | Sept. 11, 1945 |
| 2,444,019 | Krueger | June 22, 1948 |